US012705090B2

(12) United States Patent
Holm et al.

(10) Patent No.: US 12,705,090 B2
(45) Date of Patent: Aug. 11, 2026

(54) TRACKING BUFFER REDUCTION AND REUSE IN A PROCESSOR

(71) Applicant: Arm Limited, Cambridge (GB)

(72) Inventors: Rune Holm, Oslo (NO); Jens Olson, San Jose, CA (US); Jared Corey Smolens, Santa Clara, CA (US); Dominic Hugo Symes, Cambridge (GB); Elliot Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 842 days.

(21) Appl. No.: 18/099,595

(22) Filed: Jan. 20, 2023

(65) Prior Publication Data

US 2024/0248755 A1 Jul. 25, 2024

(51) Int. Cl.

*G06F 30/27* (2020.01)
*G06F 9/355* (2018.01)
*G06F 9/48* (2006.01)
*G06F 16/583* (2019.01)
*G06F 18/2411* (2023.01)
*G06F 3/06* (2006.01)

(52) U.S. Cl.

CPC .......... *G06F 9/4881* (2013.01); *G06F 9/3555* (2013.01)

(58) Field of Classification Search

None

See application file for complete search history.

(56) References Cited

U.S. PATENT DOCUMENTS 5,961,639 A * 10/1999 Mallick ................. G06F 9/3822 712/E9.05
11,429,391 B2 * 8/2022 Liu ....................... G06F 9/4881
11,853,762 B1 * 12/2023 Thangam ............ G06F 9/30112
2012/0124586 A1 * 5/2012 Hopper ............... G06F 9/30189 718/102
2020/0193976 A1 * 6/2020 Cartwright .............. G06F 3/011
2020/0210814 A1 * 7/2020 Mehr ..................... G06N 3/088

(Continued)

FOREIGN PATENT DOCUMENTS

CN 114489803 A 5/2022

OTHER PUBLICATIONS

UKIPO Combined Search and Examination Report dated Jul. 10, 2024 for GB Application No. GB2400302.2.

*Primary Examiner* — Hyun Nam

(74) *Attorney, Agent, or Firm* — EIP US LLP

(57) ABSTRACT

A processor comprising: a handling unit; a plurality of components each configured to execute a function. The handling unit can receive a task comprising operations on data in a coordinate space having N dimensions, receive a data structure describing execution of the task and comprising a partially ordered set of data items each associated with instructions usable by the plurality of components when executing the task, each data item is associated with a component among the plurality of components, each data item indicates dimensions of the coordinates space for which changes of coordinate causes the function of the associated component to execute, and dimensions of the coordinate space for which changes of coordinate causes the function of the associated component to store data ready to be used by another component. The handling unit iterates over the coordinate space and executes the task using the partially ordered set of data items.

20 Claims, 5 Drawing Sheets

| Section# | 0 | 1 | 2 | 3 | 4 | 5 | 6 |
|---|---|---|---|---|---|---|---|
| description | IFM load | Weight load | Bias load | Conv | Scale load | Scale | OFM write |
| Func unit | IR | WD | IR | CE | IR | VE | OW |
| S0 pipe | - | - | - | 0 | - | 3 | 5 |
| S1 pipe | - | - | - | 1 | - | 4 | - |
| S2 pipe | - | - | - | 2 | - | - | - |
| Dest pipe | 0 | 1 | 2 | 3 | 4 | 5 | - |
| Dimension mapping for conv | Number of steps along each dimension | | | | | | |
| OFM C | 5 | 5 | 5 | 5 | 5 | 5 | 5 |
| Batch | 1 | 1 | 1 | 1 | 1 | 1 | 1 |
| OFM Y | 4 | 4 | 1 | 4 | 1 | 4 | 4 |
| OFM X | 3 | 3 | 1 | 3 | 1 | 3 | 3 |
| IFM C | 2 | 2 | 1 | 2 | 1 | 1 | 1 |
| Kernel Y | 1 | 1 | 1 | 1 | 1 | 1 | 1 |
| Kernel X | 1 | 1 | 1 | 1 | 1 | 1 | 1 |
| Unused | 1 | 1 | 1 | 1 | 1 | 1 | 1 |
| DIMS_INC_RUN | 7 | 7 | 2 | 7 | 2 | 4 | 4 |

402

(56) References Cited

U.S. PATENT DOCUMENTS

2020/0302228 A1* 9/2020 Sinha .................... G06F 18/217
2021/0120270 A1* 4/2021 Massimino .......... H04N 19/129
2021/0150316 A1* 5/2021 Riemenschneider .. G06N 3/045
2021/0224630 A1 7/2021 Sidhir et al.
2022/0309037 A1* 9/2022 Gutierrez ................ G06F 16/16
2024/0248755 A1* 7/2024 Holm .................... G06F 9/3555
2025/0085943 A1* 3/2025 Jindel ..................... G06F 8/452
2025/0362966 A1* 11/2025 Holm ...................... G06F 9/505

* cited by examiner

200

| Operation space (task) | | | | |
|---|---|---|---|---|
| Dim | BndBox Lower | BndBox Upper | Block size | # Steps |
| DIM0 | 16 | 55 | 8 | 5 |
| DIM1 | 0 | 0 | 1 | 1 |
| DIM2 | 64 | 127 | 16 | 4 |
| DIM3 | 0 | 47 | 16 | 3 |
| DIM4 | 0 | 15 | 8 | 2 |
| DIM5 | | 2 | 3 | 1 |
| DIM6 | | 2 | 3 | 1 |
| DIM7 | | 0 | 1 | 1 |

208

102 202 204 206

| Section# | 0 | 1 | 2 | 3 | 4 | 5 | 6 |
|---|---|---|---|---|---|---|---|
| description | IFM load | Weight load | Bias load | Conv | Scale load | Scale | OFM write |
| Func unit | IR | WD | IR | CE | IR | VE | OW |
| S0 pipe | - | - | - | 0 | - | 3 | 5 |
| S1 pipe | - | - | - | 1 | - | 4 | - |
| S2 pipe | - | - | - | 2 | - | - | - |
| Dest pipe | 0 | 1 | 2 | 3 | 4 | 5 | - |
| Dimension mapping for conv | Number of steps along each dimension | | | | | | |
| OFM C | 5 | 5 | 5 | 5 | 5 | 5 | 5 |
| Batch | 1 | 1 | 1 | 1 | 1 | 1 | 1 |
| OFM Y | 4 | 4 | 1 | 4 | 1 | 4 | 4 |
| OFM X | 3 | 3 | 1 | 3 | 1 | 3 | 3 |
| IFM C | 2 | 2 | 1 | 2 | 1 | 1 | 1 |
| Kernel Y | 1 | 1 | 1 | 1 | 1 | 1 | 1 |
| Kernel X | 1 | 1 | 1 | 1 | 1 | 1 | 1 |
| Unused | 1 | 1 | 1 | 1 | 1 | 1 | 1 |

| Section# | 0 | 1 | 2 | 3 | 4 | 5 | 6 |
|---|---|---|---|---|---|---|---|
| description | IFM load | Weight load | Bias load | Conv | Scale load | Scale | OFM write |
| Func unit | IR | WD | IR | CE | IR | VE | OW |
| S0 pipe | - | - | - | 0 | - | 3 | 5 |
| S1 pipe | - | - | - | 1 | - | 4 | - |
| S2 pipe | - | - | - | 2 | - | - | - |
| Dest pipe | 0 | 1 | 2 | 3 | 4 | 5 | - |
| Dimension mapping for conv | Number of steps along each dimension | | | | | | |
| OFM C | 5 | 5 | 5 | 5 | 5 | 5 | 5 |
| Batch | 1 | 1 | 1 | 1 | 1 | 1 | 1 |
| OFM Y | 4 | 4 | 1 | 4 | 1 | 4 | 4 |
| OFM X | 3 | 3 | 1 | 3 | 1 | 3 | 3 |
| IFM C | 2 | 2 | 1 | 2 | 1 | 1 | 1 |
| Kernel Y | 1 | 1 | 1 | 1 | 1 | 1 | 1 |
| Kernel X | 1 | 1 | 1 | 1 | 1 | 1 | 1 |
| Unused | 1 | 1 | 1 | 1 | 1 | 1 | 1 |
| DIMS_INC_RUN | 7 | 7 | 2 | 7 | 2 | 4 | 4 |

| Section# | 0 | 1 | 2 | 3 | 4 | 5 | 6 |
|---|---|---|---|---|---|---|---|
| description | IFM load | Weight load | Bias load | Conv | Scale load | Scale | OFM write |
| Func unit | IR | WD | IR | CE | IR | VE | OW |
| S0 pipe | - | - | - | 0 | - | 3 | 5 |
| S1 pipe | - | - | - | 1 | - | 4 | - |
| S2 pipe | - | - | - | 2 | - | - | - |
| Dest pipe | 0 | 1 | 2 | 3 | 4 | 5 | - |
| Dimension mapping for conv | Number of steps along each dimension | | | | | | |
| OFM C | 5 | 5 | 5 | 5 | 5 | 5 | 5 |
| Batch | 1 | 1 | 1 | 1 | 1 | 1 | 1 |
| OFM Y | 4 | 4 | 1 | 4 | 1 | 4 | 4 |
| OFM X | 3 | 3 | 1 | 3 | 1 | 3 | 3 |
| IFM C | 2 | 2 | 1 | 2 | 1 | 1 | 1 |
| Kernel Y | 1 | 1 | 1 | 1 | 1 | 1 | 1 |
| Kernel X | 1 | 1 | 1 | 1 | 1 | 1 | 1 |
| Unused | 1 | 1 | 1 | 1 | 1 | 1 | 1 |
| DIMS_INC_RUN | 7 | 7 | 2 | 7 | 2 | 4 | 4 |
| DIMS_INC_BUF | 7 | 7 | 2 | 4 | 2 | 4 | 4 |

TRACKING BUFFER REDUCTION AND REUSE IN A PROCESSOR

BACKGROUND OF THE INVENTION

Field of the Invention

The present invention relates to methods, processors, and non-transitory computer-readable storage media for processing a request to execute a task.

Description of the Related Technology

Certain data processing techniques, such as neural network processing, requires reading and writing data to a storage. In some instances, data stored in a storage is read multiple times. Moreover, the dimensionality of data may change during processing. It's desirable to efficiently handle storage and access to information usable for data processing.

SUMMARY

According to a first aspect of the present disclosure there is provided a processor comprising: a handling unit; a plurality of components, each component configured to execute a function; a storage accessible to the plurality of components; the handling unit configured to: receive a task comprising operations on data in a coordinate space having N=>1 dimensions, receive a data structure describing execution of the task. The data structure comprises a partially ordered set of data items, each data item comprising data associated with one or more instructions usable by the plurality of components when executing the task, wherein each data item is associated with a component among the plurality of components, wherein each data item indicates: the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, wherein the stored data being ready to be consumed by a function of a component associated with a subsequent data item in the partially ordered set of data items or to store final output data for the task. The handling unit is further configured to iterate over the N=>1 dimensional coordinate space and execute the task using the plurality of components based at least in part on the partially ordered set of data items.

According to a second aspect of the present disclosure, there is provided a method of generating a data structure for execution of a task comprising operations on data in a coordinate space having N=>1 dimensions, the task configured for execution on a processor comprising a plurality of components, each component configured to execute a function, wherein the processor further comprises a storage accessible to the plurality of components and a handling unit, the handling unit configured to iterate over the N=>1 dimensional coordinate space and executing the task using the plurality of components based on a received data structure. The method comprises generating the data structure describing execution of the task, wherein the data structure comprises a partially ordered set of data items, each data item comprising data associated with one or more instructions usable by the plurality of components when executing the task, wherein each data item is associated with a component among the plurality of components. Each data item indicates the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task.

According to a third aspect of the present disclosure there is provided a method performed by a processor, the processor comprising a plurality of components, each component configured to execute a function and a storage accessible to the plurality of components, the method comprising: receiving a task comprising operations on data in a coordinate space having N=>1 dimensions; receiving a data structure describing execution of the task. The data structure comprises a partially ordered set of data items, each data item comprising data associated with one or more instructions usable by the plurality of components when executing the task, wherein each data item is associated with a component among the plurality of components, wherein each data item indicates: the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data item or to store final output data for the task. The method further comprises iterating over the N=>1 dimensional coordinate space and executing the task using the plurality of components based at least in part on the partially ordered set of data items.

According to a fourth aspect of the present disclosure there is provided a non-transitory computer-readable storage medium comprising a set of computer-readable instructions stored thereon which, when executed by at least one processor comprising a plurality a plurality of components, each component configured to execute a function and a storage accessible to the plurality of components, the instructions are arranged to cause the at least one processor to: receive a task comprising operations on data in a coordinate space having N=>1 dimensions, receive a data structure describing execution of the task. The data structure comprises a partially ordered set of data items, each data item comprising data associated with one or more instructions usable by the plurality of components when executing the task, wherein each data item is associated with a component among the plurality of components, wherein each data item indicates: the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task. The set of instructions stored thereon are arranged to iterate over the N=>1 dimensional coordinate space and execute the task using the plurality of components based at least in part on the partially ordered set of data items.

BRIEF DESCRIPTION OF THE DRAWINGS

Further features will become apparent from the following description of examples, which is made with reference to the accompanying drawings.

FIG. 4 is a schematic diagram of dimensions in operation coordinate space that causes a function of a component to execute for an example task.

FIG. 5 is a schematic diagram of dimensions in operation coordinate space that causes a function of a component to store data ready to be consumed by another component when executing an example task.

DETAILED DESCRIPTION OF CERTAIN INVENTIVE EMBODIMENTS

Figures 1, 2:
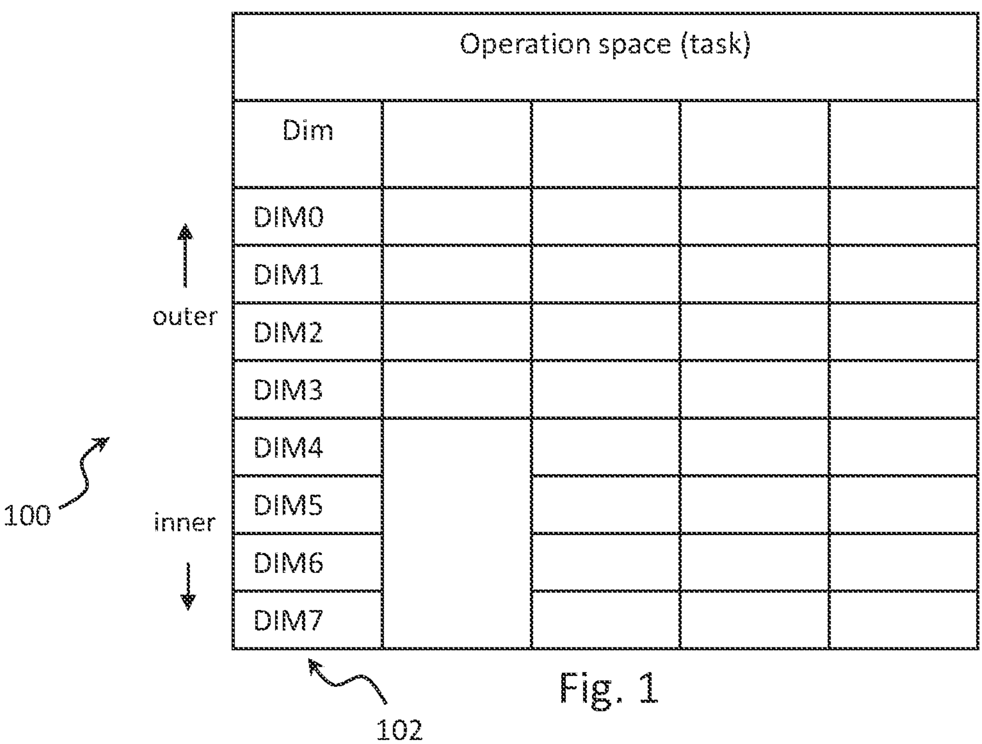
FIG. 1 is a schematic diagram of an operation coordinate space according to examples.
FIG. 2 is a schematic diagram of a bounding box in operation coordinate space dimensions for an example task.

This disclosure describes procedures, as well as methods, systems and computer-readable media for processing a request to execute a task.

A first aspect of the disclosure relates to a processor comprising a plurality of components, each configured to execute a function, and a storage accessible to the plurality if components. The processor further comprises a handling unit configured to coordinate execution of a task comprising instructions that each is associated to a component among the plurality of components. The task comprises operations on data in a coordinate space having N=>1 dimensions. Depending on the details of the instructions, and the functions of the component associated with the instructions, the rate of operations (e.g., consumption and production) of data may differ for each component. To provide efficient execution of the task, the handling unit thus needs to coordinate the interaction of the components and track data dependencies across the components. For that reason, the handling unit receives a data structure describing execution of the task, wherein the data structure comprises a partially ordered set of data items, each data item comprising data associated with one or more instructions usable by the plurality of components when executing the task, wherein each data item is associated with a component among the plurality of components. Each of the data items indicates the dimensions of the coordinates space for which changes of coordinate in said dimensions while executing the task causes the function of the associated component to execute. Each of the data items further indicates the dimensions of the coordinate space for which changes of coordinate in said dimensions while executing the task causes the function of the associated component to store data in the storage, wherein the stored data being ready to be consumed by a function of a component associated with a subsequent data item in the partially ordered set of instructions or to store final output data for the task. Advantageously, these two indications in each data item may allow the handling unit to in an efficient way iterate over the N=>1 dimensional coordinate space and execute the task using the plurality of components based at least in part on the partially ordered set of data items.

As used herein, "partially ordered set of data items" refers to the concept of an ordering, sequencing, or arrangement of the elements of a set. A partially ordered set consists of a set together with a binary relation indicating that, for certain pairs of elements in the set, one of the elements precedes the other in the ordering. The relation itself is called a "partial order." As used herein, a (second) data item "subsequent" to another (first) data item in the "partially ordered set" refers to two data items having such a binary relation such that the first data item precedes the second data item in the ordering. Put differently, the order of the sequence of data items may be set based on a data flow graph which describe how data should flow while executing the task. The data items are thus linked how data will be read and write during execution of the task, resulting in a directed acyclic graph.

As used herein, "coordinate space having N=>1 dimensions" refers to a common operation space for all functions of the components needed to execute the task. The data may represent at least part of a multi-dimensional tensor which is processed when executing the task.

By defining such a common coordinate space, chaining of the functions needed to perform the task may be simplified and efficient coordination of the task by the handling unit may be achieved.

In some examples, the handling unit is configured to iterate over the N=>1 dimensional coordinate space in a same order for each of the plurality of components. In these examples, each data item may comprise a first number indicating the dimensions of the coordinate space for which changes of coordinate in said dimensions while executing the task causes the function of the associated component to execute. For example, in case changes of coordinates in 3 out of 8 dimensions in the common coordinate space causes a function of a particular component to execute, and the dimensions are ordered such that these three are iterated over as the last three, the number "3" may indicate this to the handling unit. Consequently, this indication may be represented in the data items in an efficient way, using few bits.

Similarly, the data items may comprise a second number indicating the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task. For example, in case changes in coordinate in 2 out of 8 dimensions in the common coordinate space causes a buffer of data to be available for a subsequent component (based on the partially ordered set of data items), and the dimensions are ordered such that these two are iterated over as the last two, the number "2" may indicate this to the handling unit. Consequently, this indication may be represented in the instruction in an efficient way, using few bits and in a low complexity way.

In some examples, the first number is an integer between 0 and N, and wherein the second number is an integer between 0 and N, wherein the second number is equal or less than the first number. In this example, 0 means that the function of the component associated with the data item is executed (invoked, run, etc.) exactly once while iterating over the common operation space. The opposite extreme, N, means that function of the component associated with the data item is executed for each coordinate change on every dimension in the common operation space. Similarly for the second number, 0 means that the function of the component associated with the data item provides a buffer of data for a subsequent component exactly once while iterating over the common operation space. The opposite extreme, N, means that function of the component associated with the data item provides a buffer of data for a subsequent component on each coordinate change on every dimension in the common operation space. The second number cannot be larger than the first number in this context. In case the second number is less than the first number, this indicates a reduction operation.

In some examples, wherein the storage is being divided into segments, a first component of the plurality of components is allocated a first segment to which data is written by the function of the associated component during execution of the task, wherein a second component of the plurality of components is allocated the first segment from which data is read by the function of the associated component during execution of the task. By allowing the handling unit to track data dependencies across the components, this embodiment may provide an efficient way of passing data between components when executing a task. For example, a first data item of the partially ordered set of data items may be associated with the first component, and wherein a second data item subsequent to the first data item in the partially ordered set of data items may be associated with the second component. Consequently, the handling units may coordinate the interaction of the components and track data dependencies across the components based on the sequence order of the data items. The handling unit may track data dependencies of the components and may initiate processing by a function of a component when it has determined that all input data are available. With the specification of the dimensions of the operating space as described herein, e.g., specifying the dimensions of the coordinate space for which changes of coordinate will cause final data to be stored (ready to be consumed by component associated with a subsequent data item), the handling unit may in an efficient way coordinate execution of the task.

In some example, wherein the storage is being divided into segments, a first component of the plurality of components is allocated a first segment to which data is written by the function of the associated component during execution of the task, wherein a second component of the plurality of components is allocated a second segment to which data is written by the function of the associated component during execution of the task, wherein third component of the plurality of components is allocated the first and second segments from which data is read by the function of the associated component during execution of the task. Advantageously, this may provide a more flexible solution for data dependencies across the components as well as improved efficiency when executing the task. For example, a first data item of the partially ordered set of data items may be associated with the first component, a second data item of the partially ordered set of data items may be associated with the second component, and a third data item subsequent to the first and second data item in the partially ordered set of data items may be associated with the third component. Consequently, the handling units may coordinate the interaction of the components and track data dependencies across the components based on the sequence order of the data items. The handling unit may track data dependencies of the components and initiates processing in a function of a component when it has determined that all input data are available, i.e., using the specification of the applicable dimensions (for execution and storing final data) in the data items as described herein. In other examples, a first component of the plurality of components is allocated a first segment to which data is written by the function of the associated component during execution of the task, wherein a second component of the plurality of components is allocated the first segment from which data is read by the function of the associated component during execution of the task, wherein third component of the plurality of components is allocated the first segment from which data is read by the function of the associated component during execution of the task. In yet other examples, one component may write data to a plurality of segments, which may be used as inputs (read by) to one or more other components.

In examples, the task comprises at least one of: a convolutional operation, a pooling operation, a matrix multiply, a rescale, applying activation function, applying element wise unary or binary operators, transpose operation, reshape operation, pad operation, and reverse operation. Consequently, neural operations may be efficiently divided and executed by different components as described herein.

In examples, the plurality of components comprise one or more of: a weight fetch unit, a bias fetch unit, a scale fetch unit, an input feature map reader, an output feature map writer, a direct memory access (DMA) unit, a dot product unit (DPU) array, a vector engine, and a transform unit. By providing hardware/software dedicated for specific operation, efficiency may be improved. For example, such hardware/software may be specifically dedicated for scalar operations.

In examples, N=8. Eight dimensions in operation space may allow execution of all neural operations. In other examples, the number of dimensions is less or more. The processes and techniques described herein are not limited to any number of dimensions in operation space.

In examples, each data item comprises N vectors of binary values indicating, for each of the N dimensions of the coordinates space, whether changes of coordinate in said dimensions while executing the task causes the function of the associated component to execute or not and causes the function of the associated component to store data in the storage or not. For example, the binary values for a specific dimension may encode a choice of behaviors for that dimension such as reuse, recompute, reduce, output, unmapped/once. This may allow for the dimensions being iterated in different order for different components as well as increased flexibility when it comes to possible behaviors.

In examples, the storage is being divided into segments; wherein each data item further indicates allocation of at least one of: one or more segments from which data is read by the function of the associated component during execution of the task, and one or more segments in which data is stored by the function of the associated component during execution of the task. This embodiment may simplify coordination of the execution of the tasks by the handling units since also data that may be necessary for tracking data dependencies may be found in the data items.

The processor may be a dedicated hardware resource, such as a neural engine or a shader core, forming part of a GPU.

In a second aspect, the present disclosure provides a method of generating a data structure for execution of a task comprising operations on data in a coordinate space having N=>1 dimensions, the task configured for execution on a processor comprising a plurality of components, each component configured to execute a function, wherein the processor further comprises a storage accessible to the plurality of components and a handling unit, the handling unit configured to iterate over the N=>1 dimensional coordinate space and executing the task using the plurality of components based on a received data structure. The method comprises generating the data structure describing execution of the task, wherein the data structure comprises a partially ordered set of data items, each data item comprising data associated with one or more instructions usable by the plurality of components when executing the task, wherein each data item is associated with a component among the plurality of components. Each data item indicates the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task.

The second aspect may generally have the same features and advantages as the first aspect.

In a third aspect, the present disclosure provides a method performed by a processor comprising a plurality a plurality of components, each component configured to execute a function and a storage accessible to the plurality of components. The method comprises: receiving a task comprising operations on data in a coordinate space having N=>1 dimensions; receiving a data structure describing execution of the task, wherein the data structure comprises a partially ordered set of data items, each data item comprising data associated with one or more instructions usable by the plurality of components when executing the task, wherein each data items is associated with a component among the plurality of components, wherein each data item indicates: the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data item or to store final output data for the task. The method further comprises iterating over the N=>1 dimensional coordinate space and executing the task using the plurality of components based at least in part on the partially ordered set of data items. As explained with reference to the first aspect, these two indications in each data item may allow the handling unit to in an efficient way iterating over the N=>1 dimensional coordinate space and execute the task using the plurality of components based at least in part on the partially ordered set of data items.

In examples, the method comprises iterating over the N=>1 dimensional coordinate space in a same order for each of the plurality of components, wherein each data item comprises a first number indicating the dimensions of the coordinate space for which changes of coordinate in said dimensions while executing the task causes the function of the associated component to execute and a second number indicating the dimensions of the coordinate space for which changes of coordinate in said dimensions while executing the task causes the function of the associated component to store data in the storage, wherein the stored data being ready to be consumed by a function of a component associated with a subsequent data item in the partially ordered set of data items or to store final output data for the task. The first number may be an integer between 0 and N, and the second number may be an integer between 0 and N, wherein the second number is equal or less than the first number.

The third aspect may generally have the same features and advantages as the first aspect.

In a fourth aspect, the present disclosure provides a non-transitory computer-readable storage medium comprising a set of computer-readable instructions stored thereon which, when executed by at least one processor comprising a plurality a plurality of components, each component configured to execute a function and a storage accessible to the plurality of components, the instructions are arranged to cause the at least one processor to: receive a task comprising operations on data in a coordinate space having N=>1 dimensions; receive a data structure describing execution of the task, wherein the data structure comprises a partially ordered set of data items, each data item comprising data associated with one or more instructions usable by the plurality of components when executing the task, wherein each data item is associated with a component among the plurality of components, wherein each data item indicates: the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task. The instructions are further arranged to cause the at least one processor to iterate over the N=>1 dimensional coordinate space and execute the task using the plurality of components based at least in part on the partially ordered set of data items. As explained with reference to the first aspect, these two indications in each data item may allow the handling unit to in an efficient way iterating over the N=>1 dimensional coordinate space and execute the task using the plurality of components based at least in part on the partially ordered set of data items.

In examples, the set of computer-readable instructions stored thereon are arranged to: iterate over the N=>1 dimensional coordinate space in a same order for each of the plurality of components, wherein each data item comprises a first number indicating the dimensions of the coordinate space for which changes of coordinate in said dimensions while executing the task causes the function of the associated component to execute and a second number indicating the dimensions of the coordinate space for which changes of coordinate in said dimensions while executing the task causes the function of the associated component to store data in the storage, wherein the stored data being ready to be consumed by a function of a component associated with a subsequent data item in the partially ordered set of data items or to store final output data for the task. The first number may be an integer between 0 and N, and wherein the second number may be an integer between 0 and N, wherein the second number is equal or less than the first number.

The fourth aspect may generally have the same features and advantages as the first aspect.

To illustrate these aspects and examples, FIG. 1 shows a schematic diagram 100 of an operation coordinate space according to examples. In order to provide for a flexible traversal pattern when performing a task comprising operations on data, where the operations to be performed and the dimensions of the data may differ between different task, it may be advantageous to define a coordinate space having N=>1 dimensions. Most operations on data in this context may be expressed as a nested for-loop with operations. For example, a 2D convolution operation on an input tensor may be expressed as a 7D loop of scalar operations. Consequently, defining a general operation space in a coordinate system having for example eight dimensions 102 may provide a low complexity pattern for execution of any task comprising operations on data, instead of relying on fixed functions per task type, which may encompass a significant risk of missing necessary combinations of patterns. By defining a common operation space in a coordinate space for example according to FIG. 1, it may be less complex to chain a plurality of functions to be executed on data to each other and coordinate execution of these functions. Operation space dimensions 102 does not have a specific interpretation until they are projected into space for a specific task as will be described further below.

When executing a task comprising operations of data (e.g., using a plurality of components, each configured to execute a function data), it may be more efficient to work on a range of dimensions at a time, for example to reduce the requirements of fetching new data from memory and instead rely on locally cached data as much as possible. FIG. 2 is a schematic diagram 200 of a bounding box in operation coordinate space dimensions for an example task. The bounding box defines a lower value 202 and an upper value 204 for each dimension 102. Moreover, a block size 206 is defined for each dimension 102. This value may be considered as a step size in operation space while performing operations on data. The step size 206 defines a number of steps 208 that needs to be performed to complete operations of the entire bounding box for a specific dimension 102 in operation space. As shown in the example of FIG. 2, the number of steps can vary between dimensions, depending on the task to be executed. Using the nested for-loop analogy, the number of steps represent the number of steps in each for-loop among the nested for-loops.

Figure 3:
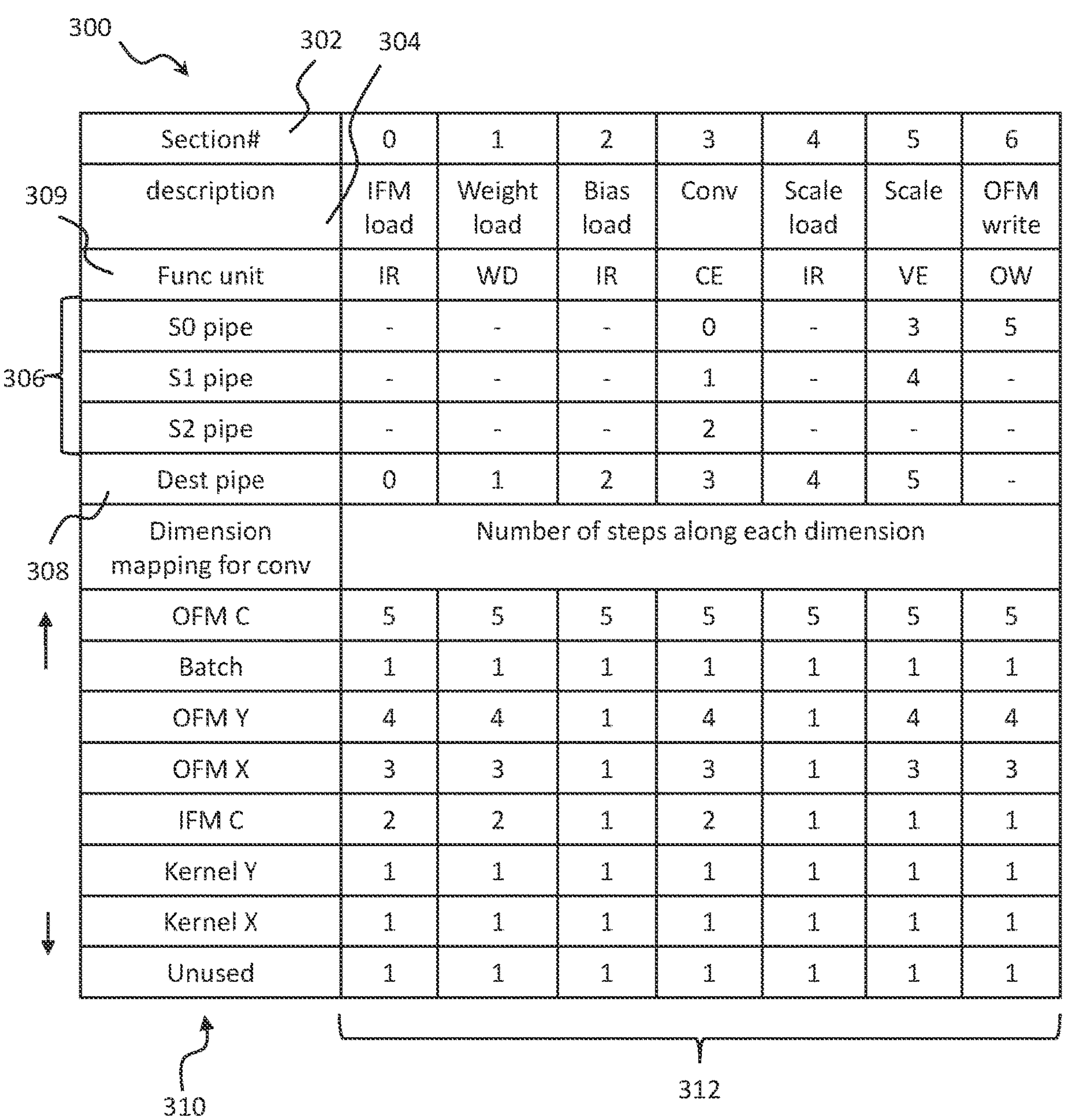
FIG. 3 is a schematic diagram of traversal in operation coordinate space and data dependencies between components when executing an example task.

FIG. 3 is a schematic representation 300 of a data structure used by a handling unit of a processor for executing a task. The processer executing the task will be further described below in conjunction with FIG. 6. The data structure comprises a partially ordered set of data items represented by columns ("sections") in FIG. 3. Each data item comprising data associated with one or more instructions (not shown in FIG. 3) usable by a plurality of components of the processor when executing the task. It should be noted that the table of FIG. 3 only is a representation of the data item used and the details and data of the table in FIG. 3 is chosen for case of description of the techniques described herein. It should also be noted that FIG. 3 uses a convolutional operation as an example of a task comprising operations on data, but that the techniques described herein may be applied to any task comprising operations on data.

The handling unit uses the data structure to coordinate traversal of the operation coordinate space and to track data dependencies between components used to execute sub task of the task.

Each section includes a description 304 indicating the function executed. Moreover, each section shows the functional unit (component) 309 that will execute a sub task of the task. The processor may thus comprise a plurality of components, each configured to execute a function.

FIG. 3 schematic representation 300 of a data structure corresponding to a convolutional operation of a part of a tensor. Local storage of the processor may be divided into segments also called pipes. Each component may be allocated a first segment (pipe) to which data is written by the function of the associated component during execution of the task. Each component may further be allocated one or more segments of storage from which data is read by the function of the associated component during execution of the task. The order of the sequence of sections (from left to right in FIG. 3) may be arranged such that a component that is allocated a particular segment to read data from is positioned subsequent to a component that is allocated the same segment to write data to. Put differently, the order of the sequence of data items may be set based on a data flow graph which describe how data should flow while executing the task. The data items are thus linked by pipes, resulting in a directed acyclic graph. Therefore, it is not a single ordered sequence of data items, it is a partial ordering specified. Depending on the partial ordering, some components may perform execution of its assigned part of the task (i.e., executing its function) concurrently and/or in different orders and still produce the same result. Consequently, the handling unit may use the order of the sections to track data dependencies and coordinate execution of the functionality of the components. The allocation of input and output pipes may in some embodiments be indicated in the data structure received by handling unit.

In the example of FIG. 3, section 0 (using an input reader component, IR with functionality for direct memory access, DMA) loads input feature map data (e.g., tensor data) to pipe (segment) 0 of a storage local to the processor. Section 1 loads weights (weights descriptors, WD) for the convolution operation to pipe 1. Section 2 (IR component with DMA) loads biases to pipe 2. Section 3 (convolutional engine CE) executes a convolutional operation using data in pipe 0-2 and produces pipe 3. Section 4 (IR with DMA) loads scale values to pipe 4. Section 5 (vector engine, VE) scales the convolved data in pipe 3 using the scale values in pipe 4 and produces pipe 5. Finally, section 6 (output writer OW, with DMA) writes the output feature map out. In other words, OW stores final output data for the task.

The handling unit may invoke a section when all source pipes 306 have a valid buffer of data, the destination pipe 308 has a free buffer and the functional unit 309 is ready. For example, the section "Conv" may be invoked when pipes 0-2 have valid data, pipe 3 is ready to be written to, and the convolution engine, CE, is ready (not busy). Each section independently steps through (traverses) operation space but may step through differently based on section dimension specifications.

The lower part of figure represents such section dimension specifications. Column 310 correspond to a specific interpretation of operation space dimensions 102 (FIG. 1). The operation space dimensions are projected into a "section space" for a specific task, in this case a convolutional operation. Output feature map channel (OFM C) corresponds to the outermost dimension 0. Batch corresponds to dimension 1. OFM y-values (Y) corresponds to dimension 2, OFM x-values (X) corresponds to dimension 3. Input feature map (IFM) channel corresponds to dimension 4. Kernel x-values correspond to dimension 5, and kernel y-values corresponds to dimension 6. Dimension 7 is not used but in case a convolutional operation using a three-dimensional kernel were to be performed, dimension 7 may correspond to kernel z-values. In other embodiments, dimension 7 is used for implementing a tile operator which may result in that a 4D tensor is doubled in rank to 8D It should be noted that based on the section functionality, the dimensions shown in FIG. 3 may be further mapped to e.g., input feature map dimensions for IFM Load section. Given the mapping of operation space to convolution space in FIG. 3, for the Input Reader DMA, the section space mapping for reading IFM may be:

| IR section space | Operation space |
|---|---|
| Batch | =Dim1 |
| Input Y | =Dim2*stride_h −top_pad +Dim5*dilation_h |
| Input X | = Dim3*stride_w −left_pad +Dim6*dilation_w |
| Input Channel | =Dim4 |

For other sections, other mappings apply. Sometimes, the mapping is a 1-1 mapping such as for example for the OFM write section:

| OW sections space | Operation space |
|---|---|
| Batch | =Dim0 |
| Output Y | =Dim1 |
| Output X | =Dim2 |
| Output Channel | =Dim3 |

In FIG. 3, the values 312 of the lower part of the table 300 corresponds to the number of steps in each dimensions needed to execute the convolutional operation on a bounding box in operation space, e.g., as described in conjunction with FIG. 2. The handling units breaks down tasks by iterating through operation space with the outermost dimension being dim0 (OFM C) and the innermost being dim7 (or dim6 in this case since dim7 is unused). The handling unit calculates the operation space bounding box (e.g., as in FIG. 2) that defines the extent of the operation space to be worked on by a functional unit for each invocation of a section (i.e., execution of the function).

The handling unit may be synchronizing the execution of multiple different parts of these nested for-loops in parallel, and therefore needs to track where in the loop a function of a component should be invoked, and where in the loop, data that may be needed by subsequent components (based on the partially ordered set of data structures) is produced. To achieve this in a flexible way, which still allows for a straightforward hardware implementation, two types of dimensions are specified in each data structure. These types will now be described in conjunction with FIGS. 4 and 5.

In some types of tasks including operations on data, data is frequently "reused" multiple times over some number of dimensions. For example, in operations in a neural network, same weights may be applied to multiple elements in the Batch, X and Y dimensions of a feature map, but the weights are unique over the input and output channel dimensions. To inform the handling unit about the specifics of each function (based on the task at hand), each data structure may indicate the dimensions of the coordinates space for which changes of coordinate in said dimensions while executing the task causes the function of the associated component to execute.

In some embodiments, each data structure comprises N vectors of binary values indicating, for each of the N dimensions of the coordinates space, whether changes of coordinate in said dimensions while executing the task causes the function of the associated component to execute or not and causes the function of the associated component to store data in the storage or not. Effectively, this allows for the behavior of each component for each dimension is thus encoded as a multi-hot vector of behaviors. Behaviors may include for example reuse, recompute, reduce, output, unmapped/once.

To save bits and reduce complexity, each data structure may instead comprise a first number 402 (as well as a second number described further below in conjunction with FIG. 5) indicating the dimensions of the coordinate space for which changes of coordinate in said dimensions while executing the task causes the function of the associated component to execute, such as a number between 0 and N (number of dimensions in operation space, eight in the example of FIG. 4). In case the number is equal to 0 the section is invoked once per task (e.g., when the iteration over the N=>1 dimensional coordinate space starts or ends). This may for example corresponds to a function that loads a table to be used in subsequent sub-tasks no matter of coordinate or dimension. In the opposite extreme, the value could be equal to N, which means the function of the component is executed on every iteration of every dimension.

In FIG. 4, shaded elements correspond to dimensions (for each data structure) for which changes of the coordinate causes the function to execute. As can be seen in FIG. 4, for the data structures described as "IFM load", "weights load" and "conv", the function associated with the respective component is executed when any dimension increment. "Bias" and "scale load" are only invoked (executed) when Batch or OFM channel increment. "Scale" and "OFM write" sections are invoked when Batch, OFM C, OFM Y or OFM X increment.

In some types of tasks including operations on data, the function executed on the data may result in a fewer number of dimensions being output. For example, as can be seen in FIG. 4, a 2D convolution operation (conv) iterates over batch (N), output feature map height (OFM Y), output feature map width (OFM X), input channels (IFM C), output channels (OFM C), kernel X (KX), and kernel Y (KY). However, it reduces these seven dimensions down to four at its output (N, OFM X, OFM Y, OFM C). Similarly, a so-called "reduction operator" such as ReduceSum iterates over a tensor and sums the data across one or more dimensions, producing an output tensor with fewer dimensions than the input tensor. To inform the handling unit about the specifics of each function (based on the task at hand), each data structure may indicate the dimensions of the coordinate space for which changes of coordinate in said dimensions while executing the task causes the function of the associated component to store data in the storage, wherein the stored data being ready to be consumed by a function of a component associated with a subsequent data structure in the partially ordered set of data structures or to store final output data for the task. Put differently, when such dimension increment (i.e., the coordinate changes), a new buffer is available in the pipe to be used by a function of a component associated with a subsequent data structure in the partially ordered set of data structures, or final data for the task (i.e., for the part of the bounding box currently being processed) is being stored in an output buffer.

In some embodiments, each data structure comprises N dimension specifications, indicating, for each of the N dimensions of the coordinates space, implications on storage for each dimension when a coordinate in said dimensions changes while executing. To save bits and reduce complexity, each data structure may instead comprise a second number indicating the dimensions of the coordinate space for which changes of coordinate in said dimensions while executing the task causes the function of the associated component to store data in the storage, the stored data being ready to be consumed by a function of a component associated with a subsequent data structure in the partially ordered set of data structures or to store final output data for the task. The second number (reference 502 in FIG. 5) may be a number between 0 and N (number of dimensions in operation space, eight in the example of FIG. 4). Since the storage of data may only take place when the function of the associated component executes, the second number may be equal or less than the first number.

The second number being 0 indicates that the section (data structure) produces exactly one block of output ready to be consumed by a function of a component associated with a subsequent data structure/section. The second number being 1 indicates that the section produces output (ready to be consumed) only when operation space dimension 0 increments (coordinate changes). The second number being 2 indicates that the section produces output (ready to be consumed) when either operation space dimensions 0 or 1 increment, etc. In case the second number is less than the first number, this indicates a reduction operation.

In FIG. 5, shaded elements correspond to dimensions (for each data structure) for which changes of the coordinate causes the function of the associated component to store data in the storage, wherein the stored data being ready to be consumed by a function of a component associated with a subsequent data structure in the partially ordered set of data structures, or to store final output data for the task. As can be seen in FIG. 5, for the data structures described as "IFM load" and "Weights load", the function associated with the respective component stores data being ready to be consumed by a function of a component associated with a subsequent data structure in the partially ordered set of data structures when any dimension increment. "Bias" and "Scale load" only store data ready to be consumed by a subsequent function when Batch or OFM channel increment. "Scale" store data ready to be consumed by a subsequent function when Batch, OFM C, OFM Y or OFM X increment. "OFM write" store final output data for the task when Batch, OFM C, OFM Y or OFM X increment. For "Conv", IFM C, Kernel X and Kernel Y are marked as dimensions where the associated function will execute (see FIG. 4), but not as dimensions which causes the associated function to store data ready to be consumed. This means that these three dimensions are so called reduction dimensions, and seven dimensions are reduced to four at the output of Conv.

In examples, if an operation space dimension is marked (FIG. 4) as a dimension for which changes of coordinate in said dimensions causes the function of the associated component to execute but not marked (FIG. 5) as a dimension for which changes of the coordinate causes the function of the component that generates the input buffer for the associated component to store data in the storage, this indicates reuse of an input buffer by the executing section. For example, if we have sections A→B and the storage dimensions for A is less than the execute dimensions for B then there is reuse by B of the input buffer that was written by A. On the other hand, if the storage dimensions of B are less than the execute dimensions of B, then that is reduction by B onto the output buffer.

The data structure described in FIG. 3-5 may be generated by e.g., a compiler connected to the processor, wherein the complier is configured to generate code for the processor to execute.

Figure 6:
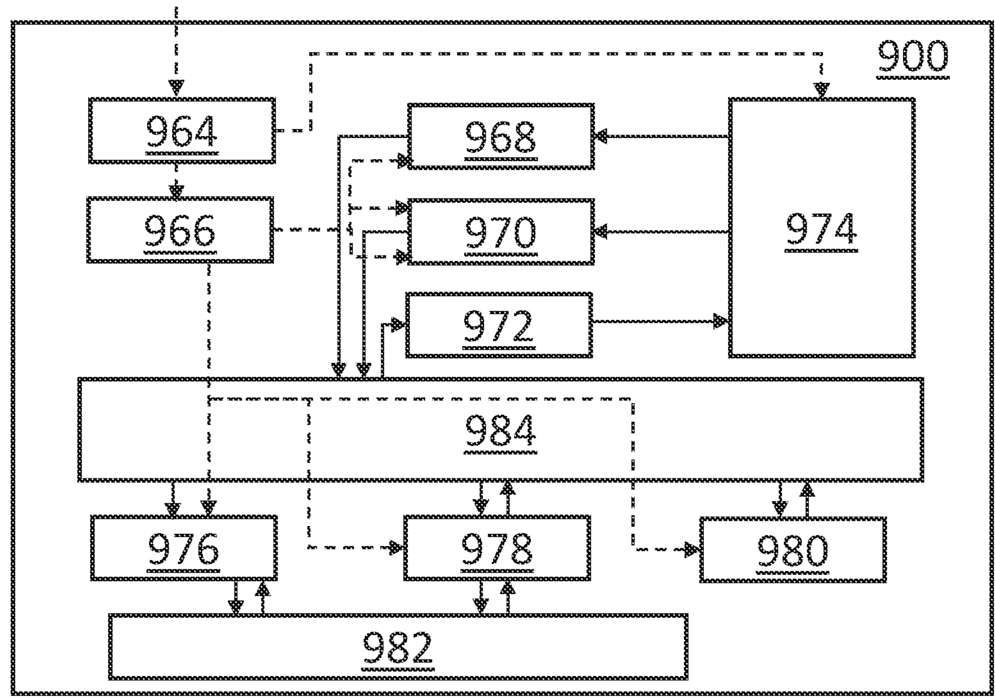
FIG. 6 is a schematic diagram of a processor according to examples.

FIG. 6 is a schematic diagram of a processor 900, comprising a handling unit 966 as described herein. In the example of FIG. 6, the processor 900 is a neural engine. The neural engine 900 includes a command and control module 964. The command and control module 964 receives tasks from a command processing unit (not shown) and also acts as an interface to storage external to the neural engine 900 (such as a L2 or L1 cache) which is arranged to store data to be processed by the neural engine 900 such as data representing a tensor, or data representing a region of a tensor. The external storage may additionally store other data to configure the neural engine 900 to perform particular processing and/or data to be used by the neural engine 900 to implement the processing such as neural network weights.

The command and control module 964 interfaces to a handling unit 966, which is for example a traversal synchronization unit (TSU). In this example, each task corresponds to a region of a tensor, which is to be convolved with weights to implement a layer of a neural network. The tensor for example represents a feature map for processing using the neural network. A neural network typically includes a sequence of layers of processing, with an output from each layer being used as an input to the next layer. Each layer for example processes an input feature map by convolving the input feature map with a set of weights to generate an output feature map, which is used as the input feature map for the next layer. The term "feature map" is used generically herein to refer to either an input feature map or an output feature map.

In this example, the handling unit 966 splits data representing a region of a tensor into a plurality of blocks of data (bounding boxes as described in conjunction with FIG. 2), each of which represents a respective part of the tensor. The handling unit 966 also obtains data structure as described above for execution of a task. Each data structure may be obtained either from storage external to the neural engine 900 such as the L2 cache, or from a local cache such as (parts of) a storage 984 of the neural engine 900. It should be noted that the storage 984 in FIG. 6 may comprise different partition or segments of storage (pipes).

The handling unit 966 coordinates (as described herein) the interaction of internal components of the neural engine 900, which include a weight fetch unit 968, an input reader (IR) 970, an output writer (OW) 972, a direct memory access (DMA) unit 974, a dot product unit (DPU) array 976, a vector engine 978, a transform unit 980, an accumulator buffer 982, and the storage 984, for processing of blocks of data. The data dependencies across the functional units are tracked by the handling unit 966 as described herein, using e.g., the second number described in conjunction with FIG. 5. Processing is initiated in a component by the handling unit 966 if all input blocks are available and space is available in the storage 984 of the neural engine 900. The storage 984 may be considered to be a shared buffer, in that various functional units of the neural engine 900 share access to the storage 984.

The weight fetch unit 968 fetches weights associated with the neural network from external storage and stores the weights in the storage 984. The input reader 970 reads data to be processed by the neural engine 900 from external storage, such as a block of data representing part of a tensor. The output writer 972 writes data obtained after processing by the neural engine 900 to external storage, such as a block of data representing part of an output feature map obtained by processing a corresponding part of an input feature map by the neural network represented by the weights fetched by the weight fetch unit 968. The weight fetch unit 968, input reader 970 and output writer 972 interface with the external storage via the DMA unit 974.

The weights and block(s) of data are processed by the DPU array 976, vector engine 978 and transform unit 980 to generate output data which is written out to the external storage by the output writer 972. The DPU array 976 is arranged to efficiently calculate a dot product between two operands, such as between an array of weights and a corresponding block of data (e.g., representing part of a tensor). The vector engine 978 is arranged to perform elementwise operations, for example to apply scale parameters to scale an output of a dot product calculated by the DPU array 976. Data generated during the course of the processing performed by the DPU array 976 and the vector engine 978 is stored temporarily in the accumulator buffer 982, from where it may be retrieved by either the DPU array 976 or the vector engine 978 for further processing as desired.

The transform unit 980 is arranged to perform in-block transforms such as dimension broadcasts or axis swaps. The transform unit 980 obtains data from the storage 984 (e.g., after processing by the DPU array 976 and/or vector engine 978) and writes transformed data back to the storage 984.

To make efficient use of the storage 984 available within the neural engine 900, the handling unit 966 determines an available portion of the storage 984, which is available during execution of part of a task (e.g., during processing of a block of data associated with the task by the DPU array 976, vector engine 978 and/or transform unit 980). The handling unit 966 determines a mapping between at least one logical address associated with data generated during execution of a second task (e.g., by processing of a block of data associated with the second task by the DPU array 976, vector engine 978 and/or transform unit 980) and at least one physical address of the storage 984 corresponding to the available portion. The logical address is for example a global address in a global coordinate system. Hence, by altering the physical address corresponding to a given logical address, the handling unit 966 can effectively control usage of the storage 984 without requiring a change in software defining the operation to be performed, as the same logical address can still be used to refer to a given element of the tensor to be processed. The handling unit 966 identifies the at least one physical address corresponding to the at least one logical address, based on the mapping, so that data associated with the logical address is stored in the available portion.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A processor comprising:
- a handling circuitry;
- a plurality of components, each component configured to execute a function;
- a storage accessible to the plurality of components;
- the handling circuitry configured to:
  - receive a task comprising operations on data in a coordinate space having N=>1 dimensions,
  - receive a data structure describing execution of the task, wherein the data structure comprises a partially ordered set of data items, each data item comprising data associated with one or more instructions usable by the plurality of components when executing the task, wherein each data item is associated with a component among the plurality of components, wherein each data item indicates:
    - the dimensions of the coordinates space for which changes of coordinate in said dimensions while executing the task causes the function of the associated component to execute, and
    - the dimensions of the coordinate space for which changes of coordinate in said dimensions while executing the task causes the function of the associated component to store data in the storage, wherein the stored data being ready to be consumed by a function of a component associated with a subsequent data item in the partially ordered set of data items or to store final output data for the task;
- wherein the handling circuitry is further configured to iterate over the N=>1 dimensional coordinate space and execute the task using the plurality of components based at least in part on the partially ordered set of data items.

2. The processor of claim 1, wherein the handling circuitry is configured to iterate over the N=>1 dimensional coordinate space in a same order for each of the plurality of components, wherein each data item comprises a first number indicating the dimensions of the coordinate space for which changes of coordinate in said dimensions while executing the task causes the function of the associated component to execute and a second number indicating the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task.

3. The processor of claim 2, wherein the first number is an integer between 0 and N, and wherein the second number is an integer between 0 and N, wherein the second number is equal or less than the first number.

4. The processor of claim 1, wherein the storage is being divided into segments, wherein a first component of the plurality of components is allocated a first segment to which data is written by the function of the associated component during execution of the task, wherein a second component of the plurality of components is allocated the first segment from which data is read by the function of the associated component during execution of the task.

5. The processor of claim 4, wherein a first data item of the partially ordered set of data items is associated with the first component, and wherein a second data item subsequent to the first data item in the partially ordered set of data items is associated with the second component.

6. The processor of claim 1, wherein the storage is being divided into segments, wherein a first component of the plurality of components is allocated a first segment to which data is written by the function of the associated component during execution of the task, wherein a second component of the plurality of components is allocated a second segment to which data is written by the function of the associated component during execution of the task, wherein third component of the plurality of components is allocated the first and second segments from which data is read by the function of the associated component during execution of the task.

7. The processor of claim 5, wherein a first data item of the partially ordered set of data items is associated with the first component, wherein a second data item of the partially ordered set of data items is associated with the second component, and wherein a third data item subsequent to the first and second data item in the partially ordered set of data items is associated with the third component.

8. The processor of claim 1, wherein the task comprises at least one of: a convolutional operation, a pooling operation, a matrix multiply, a rescale, applying activation function, applying element wise unary or binary operators, transpose operation, reshape operation, pad operation, and reverse operation.

9. The processor of claim 1, wherein the plurality of components comprise one or more of: a weight fetch unit, a bias fetch unit, a scale fetch unit, an input feature map reader, an output feature map writer, a direct memory access (DMA) unit, a dot product unit (DPU) array, a vector engine, and a transform unit.

10. The processor of claim 1, wherein the operations on data comprise scalar operations.

11. The processor of claim 1, wherein N=8.

12. The processor of claim 1, wherein each data item comprises N vectors of binary values indicating, for each of the N dimensions of the coordinates space, whether changes of coordinate in said dimensions while executing the task:

causes the function of the associated component to execute or not, and causes the function of the associated component to store data in the storage or not.

13. The processor of claim 1, wherein the storage is being divided into segments; wherein each data item further indicates:

allocation of at least one of: one or more segments from which data is read by the function of the associated component during execution of the task, and one or more segments in which data is stored by the function of the associated component during execution of the task.

14. A method of generating a data structure usable for execution of a task comprising operations on data in a coordinate space having N=>1 dimensions, the task configured for execution on a processor comprising a plurality of components, each component configured to execute a function, wherein the processor further comprises a storage accessible to the plurality of components and a handling circuitry, the handling circuitry configured to iterate over the N=>1 dimensional coordinate space and executing the task using the plurality of components based on a received data structure, the method comprising:

generating the data structure describing execution of the task, wherein the data structure comprises a partially ordered set of data items, each data item comprising data associated with one or more instructions usable by the plurality of components when executing the task, wherein each data item is associated with a component among the plurality of components, wherein each data item indicates:

the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task.

15. A method performed by a processor, the processor comprising a plurality of components, each component configured to execute a function and a storage accessible to the plurality of components, the method comprising:

receiving a task comprising operations on data in a coordinate space having N=>1 dimensions;

receiving a data structure describing execution of the task, wherein the data structure comprises a partially ordered set of data items, each data item comprising data associated with one or more instructions usable by the plurality of components when executing the task, wherein each data item is associated with a component among the plurality of components, wherein each data item indicates:

the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task;

iterating over the N=>1 dimensional coordinate space and executing the task using the plurality of components based at least in part on the partially ordered set of data items.

16. The method of claim 15, comprising iterating over the N=>1 dimensional coordinate space in a same order for each of the plurality of components, wherein each data item comprises a first number indicating the dimensions of the coordinate space for which changes of coordinate in said dimensions while executing the task causes the function of the associated component to execute and a second number indicating the dimensions of the coordinate space for which changes of coordinate in said dimensions while executing the task causes the function of the associated component to store data in the storage, wherein the stored data being ready to be consumed by a function of a component associated with a subsequent data item in the partially ordered set of data items or to store final output data for the task.

17. The method of claim 16, wherein the first number is an integer between 0 and N, and wherein the second number is an integer between 0 and N, wherein the second number is equal or less than the first number.

18. A non-transitory computer-readable storage medium comprising a set of computer-readable instructions stored thereon which, when executed by at least one processor comprising a plurality a plurality of components, each component configured to execute a function and a storage accessible to the plurality of components, the instructions are arranged to cause the at least one processor to:

receive a task comprising operations on data in a coordinate space having N=>1 dimensions;

receive a data structure describing execution of the task, wherein the data structure comprises a partially ordered set of data items, each data item comprising data associated with one or more instructions usable by the plurality of components when executing the task, wherein each data item is associated with a component among the plurality of components, wherein each data item indicates:

the dimensions of the coordinates space for which changes of coordinate in said dimensions while executing the task causes the function of the associated component to execute, and the dimensions of the coordinate space for which changes of coordinate in said dimensions while executing the task causes the function of the associated component to store data in the storage, the stored data being ready to be consumed by a function of a component associated with a subsequent data item in the partially ordered set of data items or to store final output data for the task;

iterate over the N=>1 dimensional coordinate space and execute the task using the plurality of components based at least in part on the partially ordered set of data item.

19. The non-transitory computer-readable storage medium of claim 18, wherein the set of computer-readable instructions stored thereon are arranged to:

iterate over the N=>1 dimensional coordinate space in a same order for each of the plurality of components, wherein each data item comprises a first number indicating the dimensions of the coordinate space for which changes of coordinate in said dimensions while executing the task causes the function of the associated component to execute and a second number indicating the dimensions of the coordinate space for which changes of coordinate in said dimensions while executing the task causes the function of the associated component to store data in the storage, wherein the stored data being ready to be consumed by a function of a component associated with a subsequent data item in the partially ordered set of data items or to store final output data for the task.

20. The non-transitory computer-readable storage medium of claim 19, wherein the first number is an integer between 0 and N, and wherein the second number is an integer between 0 and N, wherein the second number is equal or less than the first number.

* * * * *